S. D. ROGERS.
POWER TRANSMITTING MECHANISM FOR RAILROAD AND OTHER CARS.
APPLICATION FILED FEB. 27, 1917.
1,293,934.
Patented Feb. 11, 1919.
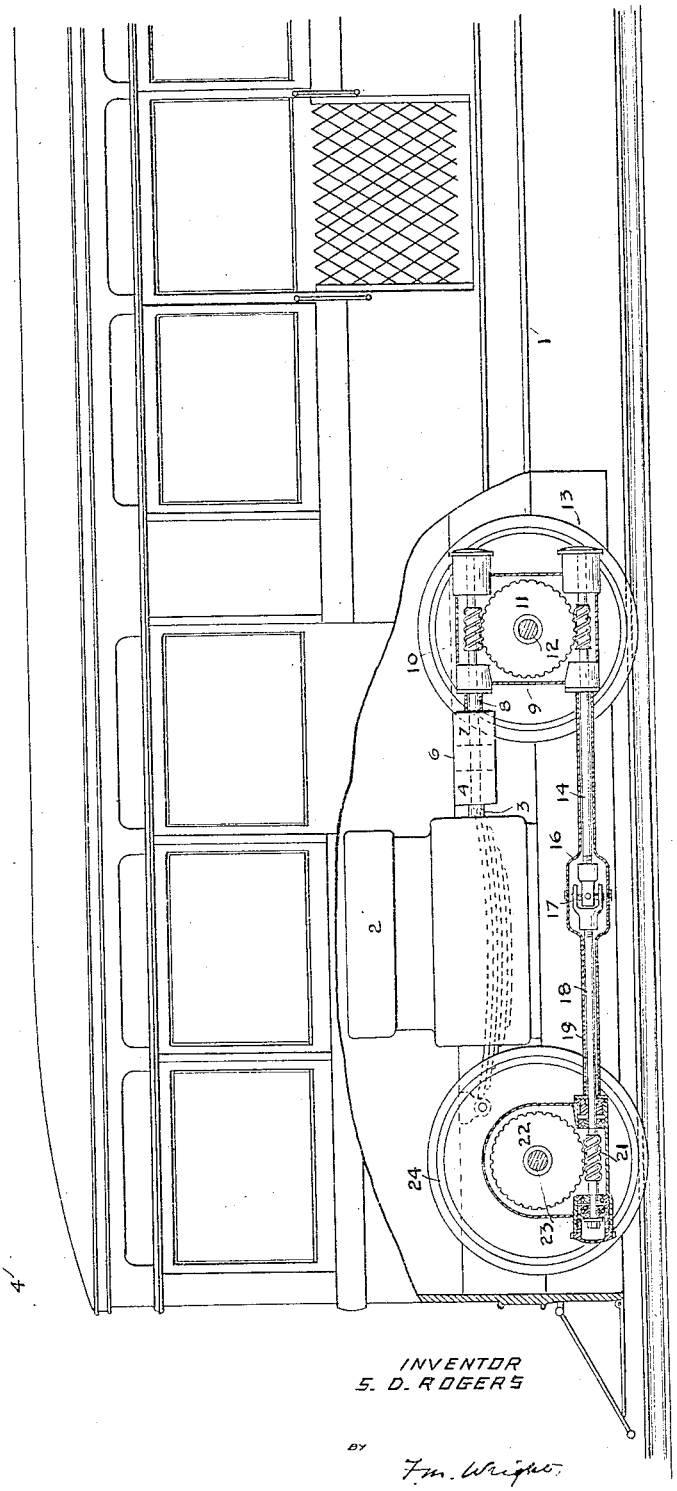
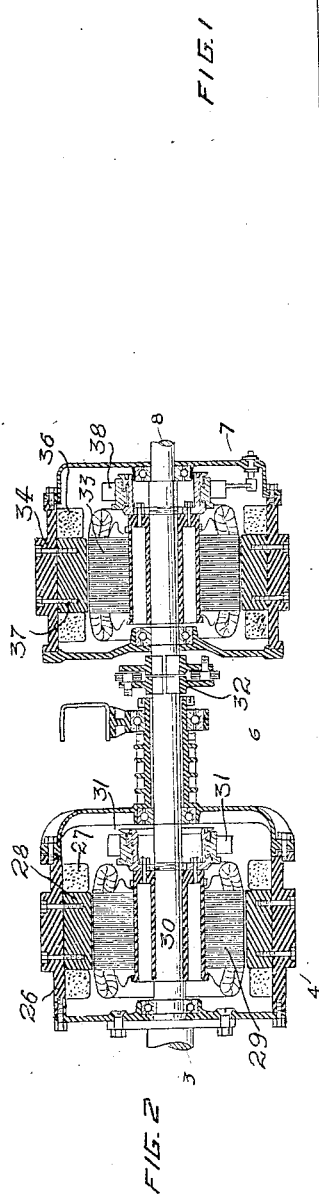
INVENTOR
S. D. ROGERS

UNITED STATES PATENT OFFICE.

SOLOMON D. ROGERS, OF SAN FRANCISCO, CALIFORNIA, ASSIGNOR TO COMMERCIAL CARS CONSTRUCTION CO., OF SAN FRANCISCO, CALIFORNIA, A CORPORATION OF CALIFORNIA.

POWER-TRANSMITTING MECHANISM FOR RAILROAD AND OTHER CARS.

1,293,934. Specification of Letters Patent. Patented Feb. 11, 1919.

Application filed February 27, 1917. Serial No. 151,289.

*To all whom it may concern:*

Be it known that I, SOLOMON D. ROGERS, a citizen of the United States, residing at San Francisco, in the county of San Francisco and State of California, have invented new and useful Improvements in Power-Transmitting Mechanism for Railroad and other Cars, of which the following is a specification.

The present invention relates to improvements in mechanisms for transmitting a propulsive force to cars, being especially adapted for propulsion of railroad cars. The object of the invention is to provide such mechanism whereby the full force of the motive power can be applied to the starting of the load from a position of rest, and also whereby the speed can be varied in any degree without appreciable loss of power.

In the accompanying drawing, Figure 1 is a broken side view of a railroad car equipped with my improved mechanism; Fig. 2 is a detail longitudinal sectional view of a magnetic clutch.

Referring to the drawing, 1 indicates the body of an interurban railroad car, such as is described in my application for Letters Patent of the United States filed November 15, 1916, Serial #131,315, the propulsive means comprising an internal combustion engine 2, located in the front portion of the car.

The crank-shaft 3, of the engine is operatively connected to one member 4, of an electro-magnetic clutch 6, such as that known as the Owen-Entz magnetic clutch, although I do not restrict my invention thereto.

The other member 7, of said clutch is connected to a longitudinally extending shaft 8, mounted in a suitable housing 9, and which at its rear end carries a worm 10, meshing with a worm wheel 11, on its upper side, said worm wheel being mounted on the shaft 12 of the rear pair of driving wheels 13, of which only one is here shown. Meshing with said worm wheel at its under side is a shaft 14, extending forwardly in a suitable housing 16, and connected at its front end to a flexible coupling 17, which coupling is also connected to the rear end of a forwardly extending shaft 18 in a housing 19, and carrying at its front end a worm 21 which meshes with a worm wheel 22, at its under side, said worm wheel 22, being mounted on the shaft 23, of the front pair of driving wheels 24, of the front truck of the car.

In order that the engine may move at a higher rate of speed than that which is communicated to the remaining parts of the transmission gear it is to be understood that the crank shaft 3 is rigidly connected to the field ring 26 of the member 4, which field ring carries the field winding 27 and the pole pieces 28, all of which rotate with the crank shaft at the same speed. The armature 29 on the shaft 30 rotates within the field and adjacent to the pole pieces. The usual brushes 31 are provided. Said shaft 30 is connected by a coupling 32 to the shaft 8. The electric motor 7 has an armature 33 carried on the shaft 8, so that the armature 29 and 33 rotate together. Outside of the armature 33 is the usual field part of the motor, comprising the field ring 34, field windings 36, pole pieces 37 and the usual brushes 38.

The field ring 26 can revolve and the armatures 29 and 33 remain stationary, or the field ring 26 may revolve at a high speed and the armature 33 at a low speed. It is by varying the relative speed of the field ring 26 and the armature 29 that speed changes are accomplished. The manner in which this is done is as follows:

On direct drive the clutch generator is short-circuited on itself and rotates the armature 29 with it. There is, however, a slight slippage between the field ring 26 and the armature 29; if the motor were working at 1000 revolutions per minute, the armature would be turning the propeller shaft at approximately 960 revolutions per minute. In other words, there is a loss of 40 revolutions per minute with the car running on a level track. If the car were mounting a heavy hill, when the engine would have to pull more, the slippage would increase slightly. The reduction in forward speed is complete by increasing the slipping between the field and the armature; thus, on low speed the field may be revolving 1000 revolutions per minute and the armature 250.

It will be seen that, by means of the above construction, the propulsive force of the engine can be applied to both pairs of wheels of the truck in such a manner that the speed of the car can be varied to any degree desired and also that the whole force of the engine can be employed in starting the car. The latter result is due to the fact that the crank-shaft can be rotated at full speed and its rotation transmitted to the driving wheels when the latter are rotating at any speed whatever.

In the clutch which it is preferred to use in my invention any slippage of the part of the clutch which rotates with the crank-shaft relatively to the part thereof which rotates with the driving wheels will generate electricity which can be utilized in any manner desired.

I claim:—

In a vehicle, the combination of front and rear pairs of driving wheels for the vehicle, an internal combustion engine, an electro-magnetic clutch, one member of which is connected with the engine shaft, a shaft extending from the other member thereof, and carrying a worm, the driving shaft of one pair of wheels carrying a worm wheel meshing with said worm, a second worm shaft meshing with said worm wheel, a worm wheel on the shaft of the other pair of driving wheels, a worm shaft carrying a worm meshing with said worm wheel and a flexible connection between the last-named worm shafts.

S. D. ROGERS.

Copies of this patent may be obtained for five cents each, by addressing the "Commissioner of Patents, Washington, D. C."